(12) United States Patent
Bartlow

(10) Patent No.: US 11,126,899 B2
(45) Date of Patent: Sep. 21, 2021

(54) IMAGE OFFSET DETERMINATION

(71) Applicant: Hewlett-Packard Development Company, L.P., Spring, TX (US)

(72) Inventor: Brian Bartlow, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 84 days.

(21) Appl. No.: 16/498,939

(22) PCT Filed: Apr. 5, 2017

(86) PCT No.: PCT/US2017/026192
§ 371 (c)(1),
(2) Date: Sep. 27, 2019

(87) PCT Pub. No.: WO2018/186858
PCT Pub. Date: Oct. 11, 2018

(65) Prior Publication Data
US 2021/0089846 A1    Mar. 25, 2021

(51) Int. Cl.
*G06K 15/02* (2006.01)
*G03G 15/00* (2006.01)
*G06K 15/00* (2006.01)
*B41J 11/46* (2006.01)

(52) U.S. Cl.
CPC .......... *G06K 15/027* (2013.01); *B41J 11/46* (2013.01); *G03G 15/5062* (2013.01); *G06K 15/408* (2013.01)

(58) Field of Classification Search
CPC ..... G06K 15/027; G06K 15/408; B41J 11/46; G03G 15/5062

USPC ................ 358/1.14, 1.15, 1.9, 2.1
See application file for complete search history.

(56) References Cited

U.S. PATENT DOCUMENTS

| | | | |
|---|---|---|---|
| 7,522,306 B2 | 4/2009 | Andersen | |
| 7,692,812 B2 | 4/2010 | Schoedinger et al. | |
| 8,150,286 B2 | 4/2012 | Yacoub | |
| 8,666,195 B1 * | 3/2014 | Mierle | G06K 9/6203 382/295 |
| 2002/0063745 A1 | 5/2002 | Osborne | |
| 2009/0162119 A1 | 6/2009 | Prabhat et al. | |
| 2013/0155139 A1 | 6/2013 | Elliot et al. | |
| 2014/0160497 A1 * | 6/2014 | Lawton | H04N 1/00087 358/1.9 |

OTHER PUBLICATIONS

CSS3 Module: Paged Media, Oct. 10, 2006, <https://www.w3.org/TR/2006/WD-css3-page-20061010/>.

* cited by examiner

*Primary Examiner* — Quang N Vo
(74) *Attorney, Agent, or Firm* — HP Inc. Patent Department

(57) ABSTRACT

Determining an image offset of a device includes receiving a printable media in a first orientation, creating a first pattern including a first plurality of symbols on a first side of the printable media, receiving the printable media in a second orientation, creating a second pattern including a second plurality of symbols overlapping the first pattern on the first side of the printable media, and determining the image offset of the device based on a difference between the first and second patterns.

16 Claims, 9 Drawing Sheets

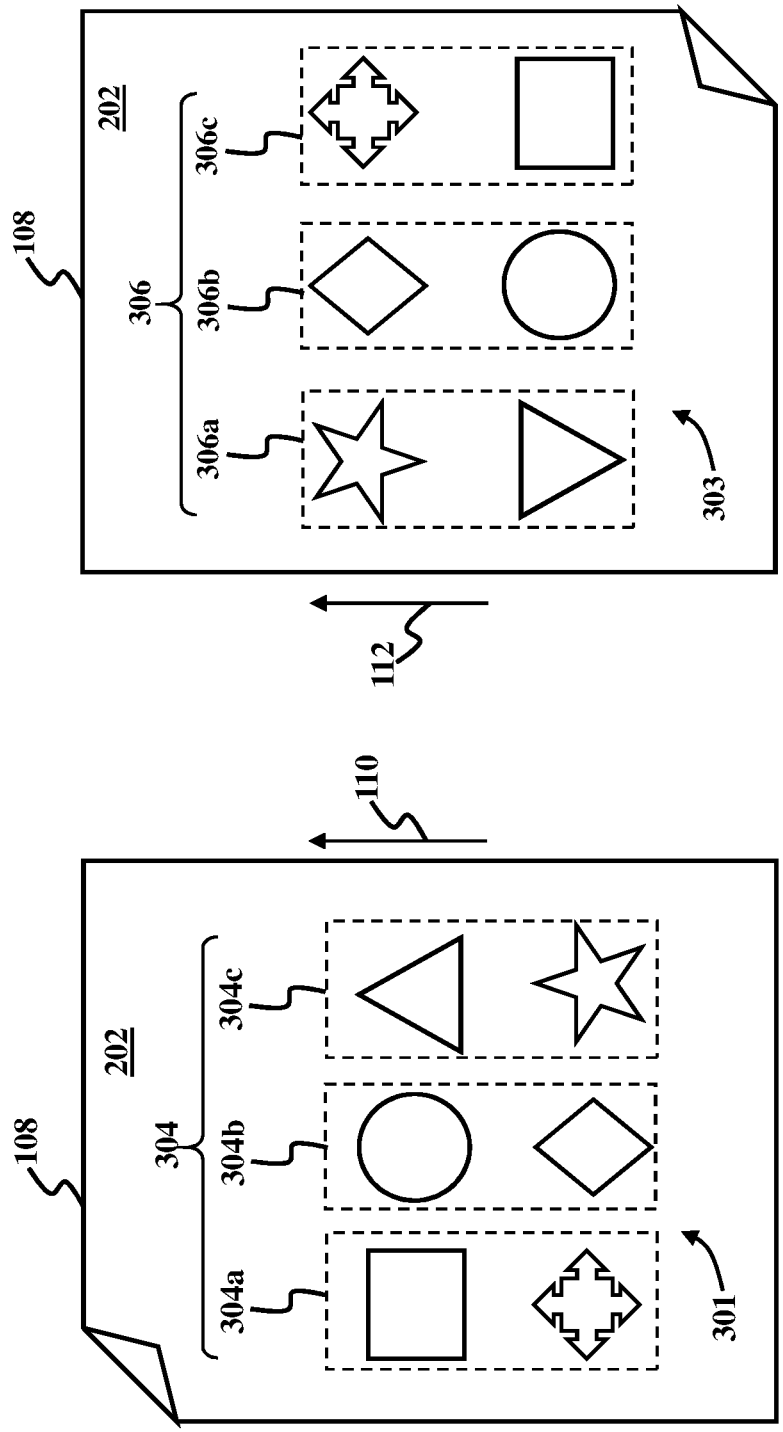

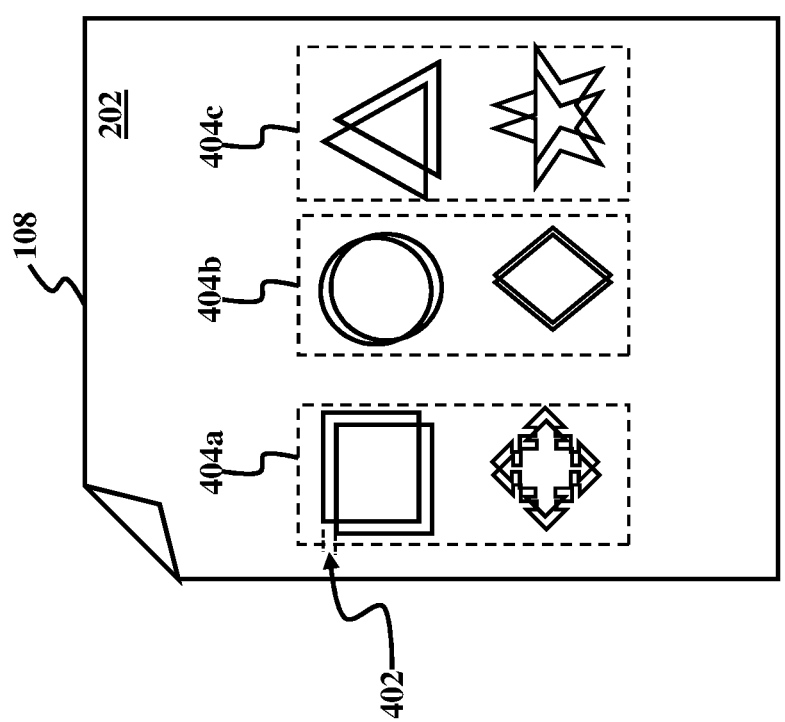

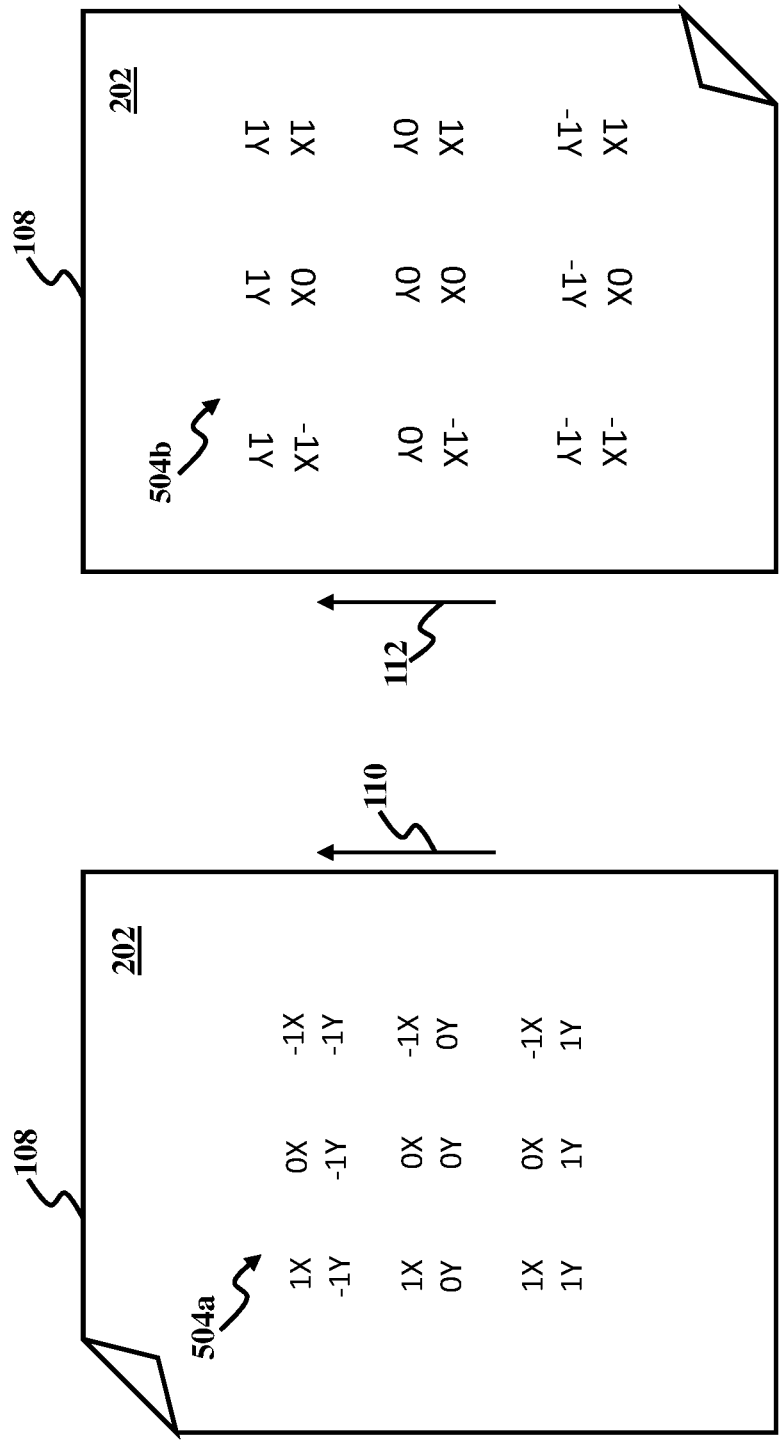

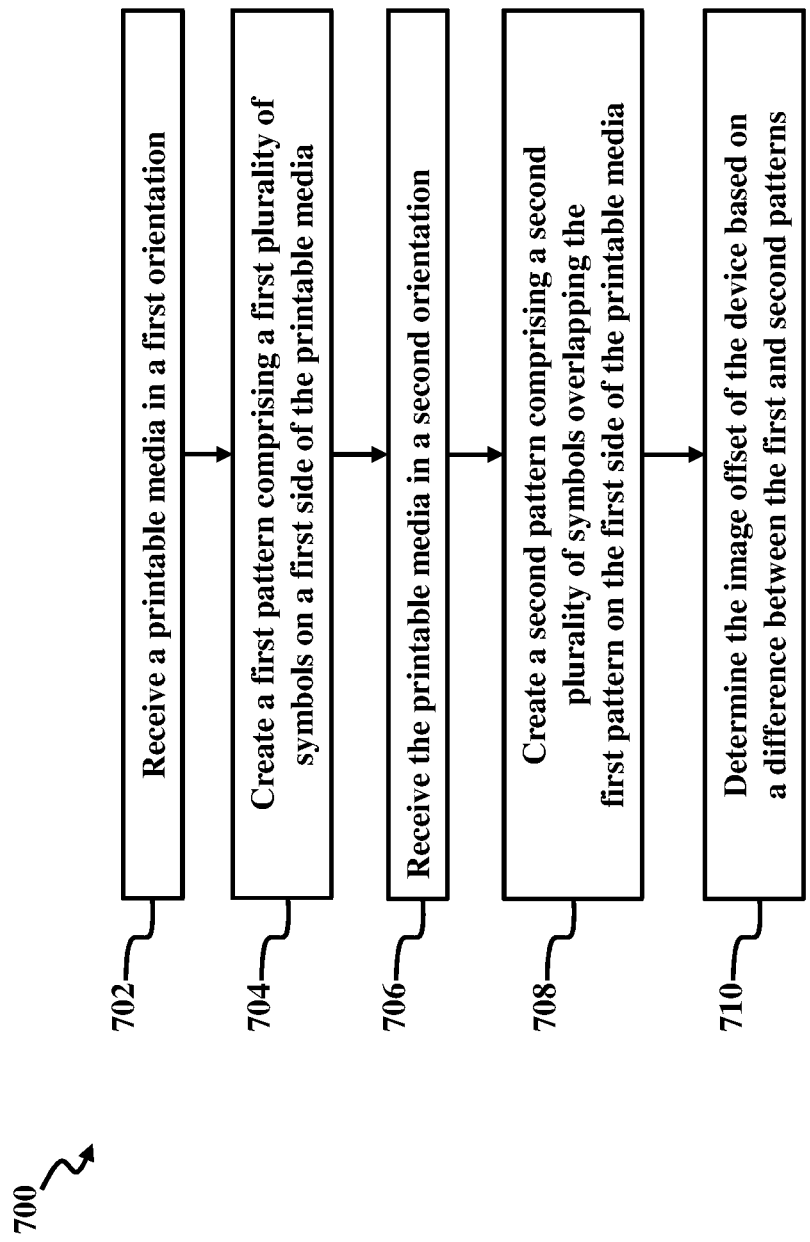

IMAGE OFFSET DETERMINATION

BACKGROUND

Printing devices may create images that are not properly centered on a printable media, such as paper. To compensate for the offset in printing, a user may attempt to print a cross hair on the printing media while instructing the printing device to print the cross hair on the center. If there is offset in creating the image on the printable media, the cross hair will not be printed on the actual center of the media. By measuring the distance between the cross hair and the actual center of the media, the user may determine the printing offset of the printing device. Such a technique utilizes tools such as a ruler or other measuring mechanism.

BRIEF DESCRIPTION OF THE DRAWINGS

FIG. 3A is a schematic diagram illustrating creating first patterns on the printable media for determining the image registration offset, according to another example herein;

FIG. 3B is a schematic diagram illustrating creating second patterns on the printable media for determining the image registration offset, according to another example herein;

FIG. 3C is a schematic diagram illustrating using patterns on the printable media for determining the image registration offset, according to an example herein;

FIG. 4A is a schematic diagram illustrating creating first patterns containing numerical values on a printable media for determining the image registration offset, according to an example herein;

FIG. 4B is a schematic diagram illustrating creating second patterns containing numerical values on a printable media for determining the image registration offset, according to an example herein;

FIG. 6 is a flow diagram illustrating a preferred method according to an example herein.

DETAILED DESCRIPTION

Compensating for the printing offset of a printing device may be achieved by adjusting an image registration of the printing device. The image registration of the printing device determines location of the image created on the printable media (e.g., paper, transparency, etc.). Printing devices may require calibrating the image registration to create images at desirable locations on the printable media. For example, to print in fields of a pre-formatted form, it may be required for the image registration of a printer to be calibrated to avoid off-centered prints in the fields of the form. The image registration of printing devices may need initial calibration before being used, or as they wear over time, they may need to be recalibrated. In practice, a user would not have to perform manual measurements with tools such as rulers to determine the offset of the printing device. An example herein provides determining image registration offset by a user without requiring the user to perform the actual measurement.

Figure 1:
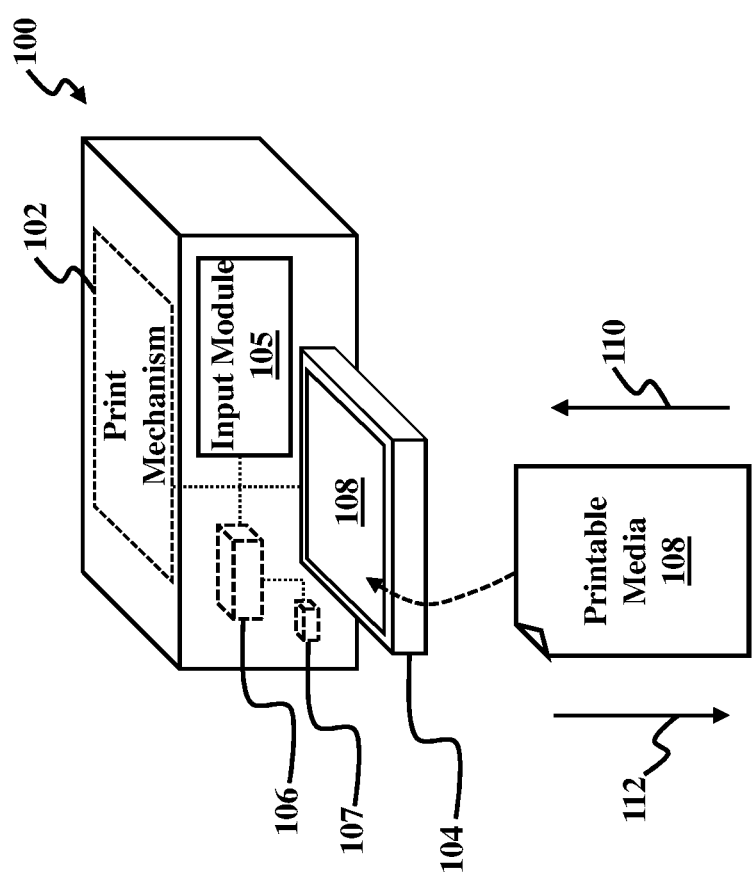
FIG. 1 illustrates a schematic diagram of a device for creating an image on a printable media, according to an example herein.

FIG. 1 is a schematic diagram illustrating a device 100 for creating an image on a printable media 108, according to an example herein. The device 100 includes a tray 104 configured to receive the printable media 108 such as paper, transparency, etc. in each of a first orientation 110 and a second orientation 112. The tray 104 may be a standard printer tray used on inkjet and laser printing devices and may be either fixed or removable depending on the type of tray and/or printing device. The device 100 may further include a print mechanism 102, an input module 105, a processor 106, and memory 107 operatively connected to the tray 104, and as further described below.

Figure 2B:
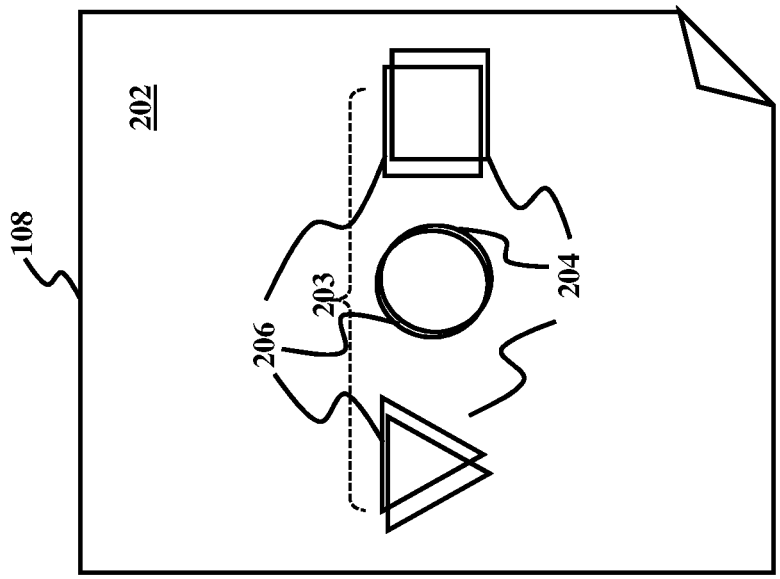
FIG. 2B is a schematic diagram illustrating creating second patterns on a printable media for determining the image registration offset, according to an example herein.
Figure 2A:
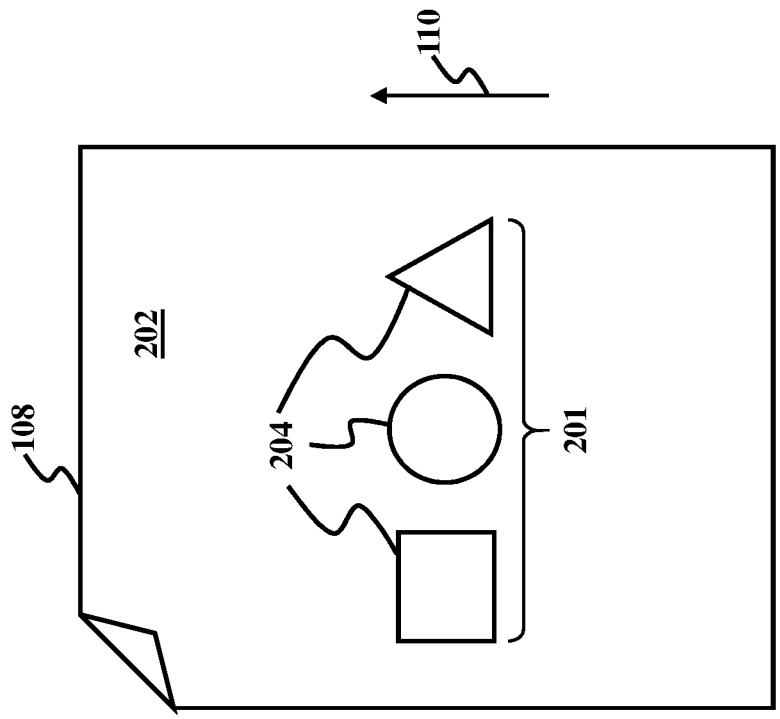
FIG. 2A is a schematic diagram illustrating creating first patterns on a printable media for determining the image registration offset, according to an example herein.

FIGS. 2A and 2B, with reference to FIG. 1, are schematic diagrams illustrating creating patterns on the printable media 108 for determining the image registration offset, according to an example herein. The print mechanism 102 of device 100 is configured to create a first pattern 201 comprising a first plurality of symbols 204 on a first side 202 of the printable media 108 in the first orientation 110, and to create a second pattern 203 comprising a second plurality of symbols 206 overlapping the first pattern on the first side 202 of the printable media 108 in the second orientation 112. In FIG. 2B, the second pattern 203 only contains the second plurality of symbols 206 and does not contain the first plurality of symbols 204. The second plurality of symbols 206 include the same symbols as the first plurality of symbols 204, but with a different orientation. The difference in orientation of the first and second plurality of symbols 204 and 206 is such that when the printable media 108 is rotated from the first orientation 110 to the second orientation 112, the symbols in the first and second plurality of symbols 204 and 206 are aligned in the same direction as each other.

In an example, the difference between the first orientation 110 and the second orientation 112 may be a 180° rotation of the printable media 108, and the difference between the orientations of the first plurality of symbols 204 and second plurality of symbols 206 may also 180°. That is, the orientation of the second plurality of symbols 206 is inverted with respect to the first plurality of symbols 204. However, other rotation angles and configurations are possible based on the shapes of the symbols 204, 206, size of the tray 104, size of the printable media 108, and print capabilities of the device 100. In some circumstances a user may physically rotate the printable media 108 from the first orientation 110 to the second orientation 112. The examples described herein and the accompanying figures provide for a 180° rotation between the first orientation 110 and the second orientation 112. However, these are only examples, and other orientations are possible as indicated above. When the first plurality of symbols 204 and second plurality of symbols 206 are symmetrical; for example, squares, circles, or other symmetrical shapes, then the orientations of the first plurality of symbols 204 and second plurality of symbols 206 may be the same. That is, the second plurality of symbols 206 do not have to be inverted with respect to the first plurality of symbols 204 even when the printable media 108 is rotated 180° from the first orientation 110 to the second orientation 112.

In other examples, the tray 104 as instructed by the processor 106 may be configured to automatically rotate the printable media 108 from the first orientation 110 to the second orientation 112. The patterns 201, 203 containing the respective symbols 204, 206 may be printed on the printable media 108 in black or it may contain other colors depending on the whether the device 100 is capable of printing in a color other than black. The print mechanism 102 may comprise the print heads, toner cartridge, and other components, which are not shown in the figures, and which are typically used to print on printable media 108.

The first plurality of symbols 204 and the second plurality of symbols 206 may include any geometric shapes, colors, or numerical values such that the first plurality of symbols 204 is unique within the first pattern 201 and correspond to a similar symbol in the second plurality of symbols 206 within the second pattern 203. The processor 106 of device 100 is configured to determine an image offset of the device 100 based on a difference between the first and second patterns 201, 203, respectively, such that the difference is visually apparent once the first and second patterns 201, 203 are printed in an overlapping manner.

FIGS. 3A and 3B, with reference to FIGS. 1 through 2B, are schematic diagrams illustrating creating patterns 301, 303 on the printable media 108 for determining the image registration offset, according to an example herein. The first and second plurality of symbols 304, 306 may be arranged as a plurality of pairs of symbols 304a, 304b, 304c and 306a, 306b, 306c, respectively. Each of the symbols in these pair of symbols 304a-304c, 306a-306c may correspond to an image registration offset in a specific dimension of the printable media 108. Therefore, as further described below, the example illustrated in FIGS. 3A and 3B provides for determining the image registration offset in two dimensions, such as the horizontal and vertical dimensions with respect to the printable media 108, by using the plurality of pair of symbols 304a-304c, 306a-306c. The patterns 301, 303 may be created on the printable media 108 in the same manner as described above with respect to patterns 201, 203.

FIG. 3C, with reference to FIGS. 1 through 3B, is schematic diagram illustrating using patterns 301, 303 of FIGS. 3A and 3B on the printable media 108 for determining the image registration offset, according to an example. The processor 106 may further be configured to compare a proximity 402 or a difference in distance of a first pair of symbols 304a of the first pattern 301 with a first pair of symbols 306a of the second pattern 303, wherein the image offset is determined by selecting the corresponding pairs of symbols from the first and second patterns 301, 303 that are closest in proximity to each other. In the example of FIG. 3C, the pair of symbols 404b, which correspond to the combined overlapping of the pair of symbols 304b and 306b, are closest to each other compared with the pair of symbols 404a or 404c. In an example, each symbol of each pair of symbols 304a-304c or 306a-306c corresponds to a value for image registration offset in horizontal or vertical axis. The value for the image registration offset may provide the distance between an off-centered image, due to lack of calibration of the printing device 100, and the physical center of the printable media 108. The value for the image registration offset may be in any distance measurement unit such as millimeters, etc. Using such correspondence, the processor 106 determines the image registration offset.

In an example, the processor 106 is further configured to compare the proximity 402 or a difference in distance. of a first pair of symbols 304a of the first pattern 301 with a first pair of symbols 306a of the second pattern 303, wherein the image offset is determined by selecting the corresponding pairs of symbols from the first and second patterns 301, 303 that comprise the greatest visual clarity between the overlapping pairs of symbols. Again, in the example of FIG. 3C, the pair of symbols 404b, which correspond to the combined overlapping of the pair of symbols 304b and 306b, create the greatest visual clarity of overlapping pairs of symbols. In other words, the overlapping pair of symbols 404b have the least amount of offset compared with the overlapping pair of symbols 404a or 404c, and thus visually, the overlapping pair of symbols 404b appear to have the greatest clarity when viewed.

Figure 4C:
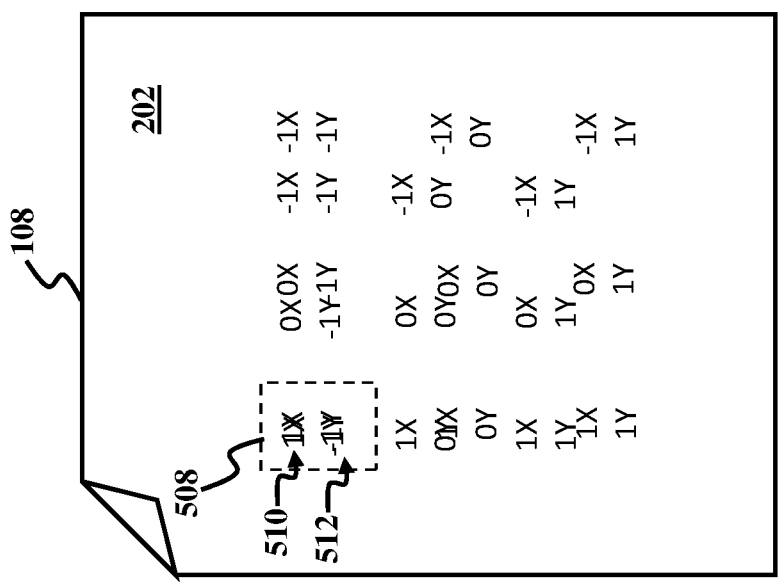
FIG. 4C is a schematic diagram illustrating determining the image registration offset based on the overlapping first and second patterns, according to an example herein.

FIGS. 4A through 4C, with reference to FIGS. 1 through 3C, are schematic diagrams illustrating creating numerical values on the printable media 108 for determining the image registration offset, according to an example herein. Here, the first and second plurality of symbols may comprise a plurality of pairs of numerical values 504a, 504b, wherein the image offset comprises a first offset value in a first dimension; for example; the horizontal direction, of the printable media 108 and a second offset value in the second dimension; for example, the vertical direction, of the printable media 108. The first offset value may provide the distance between an off-centered image and the physical center of the printable media 108, caused by lack of calibration of the printing device 100, in the horizontal dimension. The second offset value may provide the distance between an off-centered image and the physical center of the printable media 108 in the vertical dimension. The first and second offset values may be presented in any distance measurement unit such as millimeters, etc. In the example shown in FIGS. 4A through 4C, the second orientation 112 is rotated 180° with respect to the first orientation 110. In this example, the second pattern 504b is inverted compared to the first pattern 504a such that when the printable media 108 is in the second orientation 112; e.g., rotated 180° with respect to the first orientation 110, the two overlapping patterns 504a, 504b align in the same direction thereby creating overlapped pair of numerical values 508 as shown in FIG. 4C; otherwise the overlapping patterns 504a, 504b would be inverted with respect to one another.

The input module 105 is configured to receive a pair of numerical values 508. In an example, the pair of numerical values 508 are the most closely overlapped pair of numerical values and provide the greatest visual clarity among the plurality of pairs of numerical values 504a, 504b. For example, the processor 106 is further configured to determine the first offset value using a first numerical value 510 of the pair of numerical values 508 and determine the second offset value using a second numerical value 512 of the pair of numerical values 508. In an example, the first offset is the horizontal image registration offset and the second offset value is the vertical image registration offset. In this regard, horizontal and vertical refer to the respective directions on the printable media 108, either in a portrait or a landscape orientation.

Figure 5B:
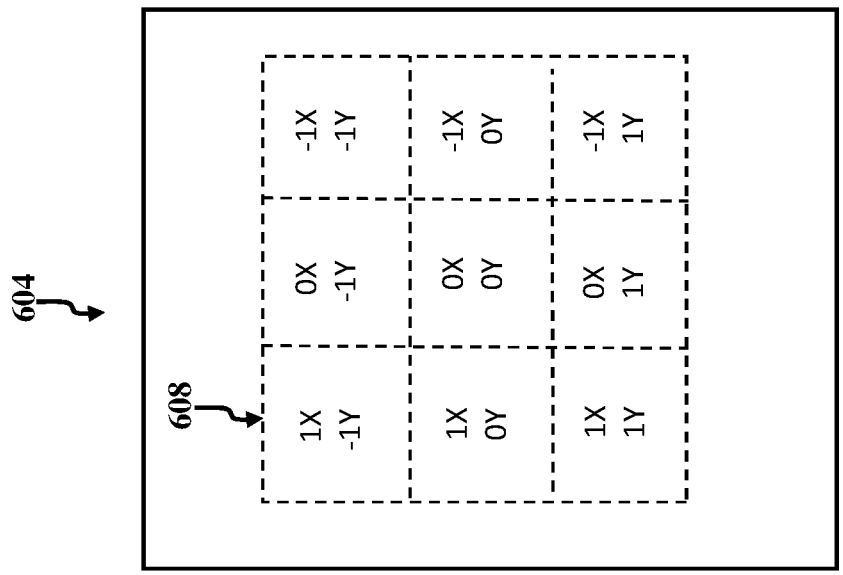
FIG. 5B is a schematic diagram illustrating a second pattern of the numerical values, according to another example herein.
Figure 5A:
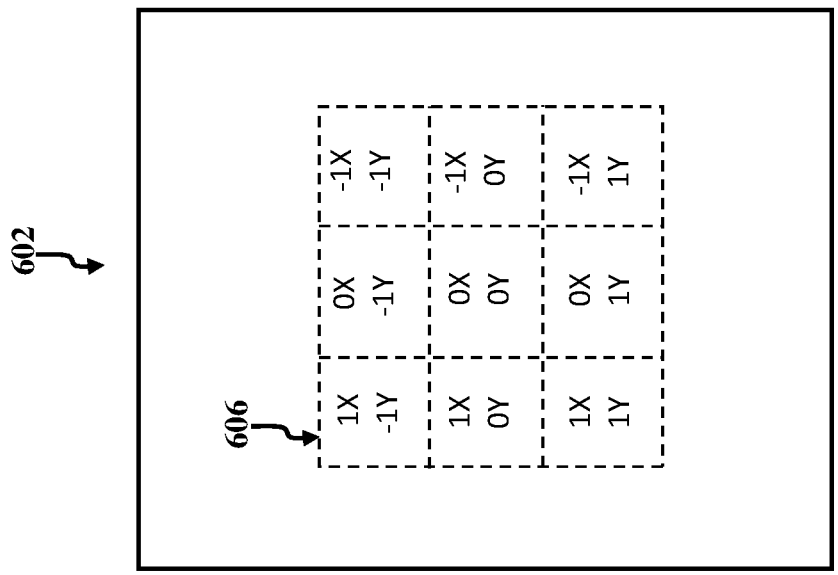
FIG. 5A is a schematic diagram illustrating a first pattern of the numerical values, according to another example herein.

FIGS. 5A and 5B, with reference to FIGS. 1 through 4C, are schematic diagrams illustrating the first and second patterns of the numerical values 504 as stored as digital files to create the numerical values on the printable media 108 as described with respect to FIGS. 4A through 4C. In an example, a first digital file 602 is created. The digital file 602 may be stored in any format readable by the processor 106, for example, but not limited to jpeg, pdf, etc. The digital file 602 includes a table 606. Each location of table 606 holds a pair of the numerical values of the plurality of the pair of numerical values 504.

A second image file 604 is created to hold a table 608 having the same size as the table 606. Each location of the table 608 holds the same pair of numerical values as the corresponding location in the table 606. The center location of the tables 606 and 608 both hold a pair of zero values and are centered in the image files 602 and 604. All other locations of the table 608 are expanded with respect to their corresponding location in the table 606 by twice the numerical value pair in that location, in each corresponding dimension.

FIG. 6, with reference to FIGS. 1 through 5C, is flow diagram illustrating a method 700 for determining an image offset of a device 100 according to an example herein. At step 702, the method 700 receives a printable media 108 in a first orientation 110. At step 704, the method 700 creates a first pattern 201 comprising a first plurality of symbols 204 on a first side 202 of the printable media 108. At step 706, the method 700 receives the printable media 108 in a second orientation 112. At step 708, the method 700 creates a second pattern 203 comprising a second plurality of symbols 206 overlapping the first pattern 201 on the first side 202 of the printable media 108. At step 710, the method 700 determines the image offset of the device 100 based on a difference between the first and second patterns 201 and 203.

In an example, the first and second plurality of symbols 204 and 206 may be arranged as a plurality of pairs of symbols 304a, 304b, 304c and 306a, 306b, 306c. In another example, the method 700 may compare a proximity of a first pair of symbols 304a of the first pattern 201 with a first pair of symbols 306a of the second pattern 203, wherein the image offset may be determined by selecting the corresponding pairs of symbols 304a, 304b, 304c and 306a, 306b, 306c from the first and second patterns 201 and 203 that are closest in proximity to each other.

In another example, the method 700 may compare a proximity of a first pair of symbols 304a of the first pattern 201 with a first pair of symbols 306a of the second pattern 203, wherein the image offset is determined by selecting the corresponding pairs of symbols 304a, 304b, 304c and 306a, 306b, 306c from the first and second patterns that comprise the greatest visual clarity between the overlapping pairs of symbols.

In another example, the first and second plurality of symbols may comprise a plurality of pairs of numerical values 504a and 504b. In another example, the image offset may comprise a first offset value in the first orientation 110 of the printable media 108 and a second offset value in the second orientation 112 of the printable media 108, and wherein the determining of the image offset may comprise setting the first offset value using a first numerical value 510 of a pair of numerical values 508; and setting the second offset value using a second numerical value 512 of the pair of numerical values 508. In an example, the second orientation 112 may be rotated 180° with respect to the first orientation 110.

Various examples herein can include both hardware and software elements. The examples that are implemented in software include but are not limited to, firmware, resident software, microcode, etc. Other examples may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device containing software code.

Figure 7:
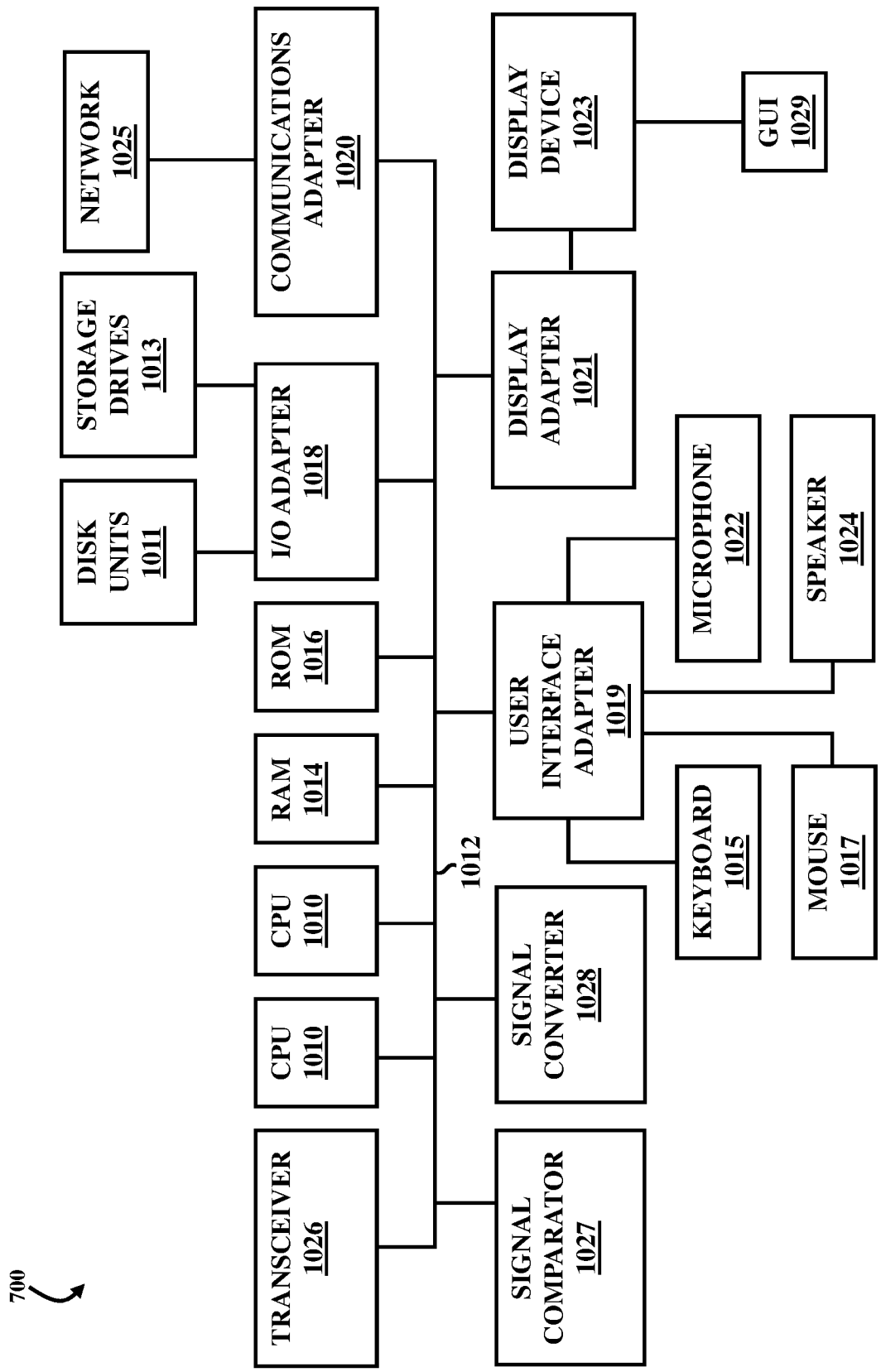
FIG. 7 illustrates a schematic diagram of a computer architecture used in accordance with the examples herein.

A representative hardware environment for practicing the examples herein is depicted in FIG. 7. This schematic drawing illustrates a hardware configuration of an information handling/computer system 700 according to an example. The system 700 comprises at least one processor or central processing unit (CPU) 1010. The CPUs 1010 are interconnected via system bus 1012 to various memory devices 1014, 1016 such as a random access memory (RAM) 1014 and a read-only memory (ROM) 1016. The memory devices 1014, 1016 can include local memory employed during actual execution of the program code, bulk storage, and cache memories which provide temporary storage of at least some program code in order to reduce the number of times code must be retrieved from bulk storage during execution. An I/O adapter 1018 can connect to peripheral devices, such as disk units 1011 and storage drives 1013, or other program storage devices that are readable by the system 700. The system 700 further includes a user interface adapter 1019 that may connect to a keyboard 1015, mouse 1017, speaker 1024, microphone 1022, and/or other user interface devices such as a touch screen device (not shown) to the bus 1012 to gather user input. Additionally, a communication adapter 1020 connects the bus 1012 to a data processing network 1025, and a display adapter 1021 connects the bus 1012 to a display device 1023, which provides a graphical user interface (GUI) 1029 for a user to interact with. Further, a transceiver 1026, a signal comparator 1027, and a signal converter 1028 may be connected to the bus 1012 for processing, transmission, receipt, comparison, and conversion of electric or electronic signals, respectively.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A method for determining an image offset of a printing device, the method, performed by the printing device, comprising:
   receiving a printable media in a first orientation;
   creating a first pattern comprising a first plurality of symbols on a first side of the printable media in the first orientation;
   receiving the printable media in a second orientation;
   creating a second pattern comprising a second plurality of symbols onto the first plurality of symbols of the first pattern on the first side of the printable media in the second orientation, wherein each pair of symbols of the second pattern overlaps each corresponding pair of symbols of the first pattern;
   selecting a first pair of symbols of the first pattern and a corresponding first pair of symbols of the second pattern that are closest in proximity to each other; and
   determining the image offset of the printing device based on the proximity between the first pair of symbols of the first pattern and the corresponding first pair of symbols of the second pattern that are closest to each other.

2. The method of claim 1, wherein the first plurality of symbols of the first pattern are arranged as a plurality of pairs of symbols and the second plurality of symbols of the second pattern are arranged as a plurality of corresponding pairs of symbols.

3. The method of claim 2, further comprising:
comparing a proximity of each pair of symbols of the first pattern with each corresponding pair of symbols of the second pattern.

4. The method of claim 1, wherein the first orientation is a portrait orientation of the printable media and the second orientation is a landscape orientation of the printable media.

5. The method of claim 1, wherein the first and second plurality of symbols comprise a plurality of pairs of numerical values.

6. The method of claim 5, wherein the image offset comprises a first offset value in the first orientation of the printable media and a second offset value in the second orientation of the printable media, and wherein the determining of the image offset comprises:
setting the first offset value using a first numerical value of a pair of numerical values; and
setting the second offset value using a second numerical value of the pair of numerical values.

7. The method of claim 1, wherein the second orientation is rotated 180° with respect to the first orientation.

8. A non-transitory computer readable medium storing instructions configured to determine an image offset of a printing device, wherein the instructions are executable to cause the printing device to:
create a first pattern comprising a first plurality of pairs of numerical values on a printable media in a first orientation of the printable media;
change the first orientation of the printable media to a second orientation of the printable media;
create a second pattern comprising a second plurality of pairs of numerical values onto the first plurality of pairs of numerical values on the printable media in the second orientation, wherein each pair of numerical values of the second pattern overlaps each corresponding pair of numerical values of the first pattern;
select a first pair of numerical values of the first pattern and a corresponding first pair of numerical values of the second pattern that are closest in proximity to each other; and
determine the image offset of the printing device based on the proximity between the first pair of numerical values of the first pattern and the corresponding first pair of numerical values of the second pattern that are closest in proximity to each other.

9. The non-transitory computer readable medium of claim 8, wherein the change of the first orientation to the second orientation comprises a 180° rotation.

10. The non-transitory computer readable medium of claim 8, wherein the image offset of the printing device comprises a first offset value in the first orientation of the printable media and a second offset value in the second orientation of the printable media, and wherein the instructions that cause the printing device to determine the image offset include instructions that cause the printing device to:
set the first offset value using a first numerical value of the first pair of numerical values of the first pattern; and
set the second offset value using a second numerical value of the first pair of numerical values of the first pattern.

11. A printing device for creating an image on a printable media, the printing device comprising:
a tray configured to receive the printable media in each of a first orientation and a second orientation;
a print mechanism configured to:
create a first pattern comprising a first plurality of symbols on a first side of the printable media in the first orientation, and
create a second pattern comprising a second plurality of symbols onto the first plurality of symbols on the first side of the printable media in the second orientation, wherein each pair of symbols of the second pattern overlaps each corresponding pair of symbols of the first pattern; and
a processor configured to:
select a first pair of symbols of the first pattern and a corresponding first pair of symbols of the second pattern that are closest in proximity to each other, and
determine an image offset of the printing device based on the proximity between the first pair of symbols of the first pattern and the corresponding first pair of symbols of the second pattern that are closest to each other.

12. The printing device of claim 11, wherein the first plurality of symbols of the first pattern are arranged as a plurality of pairs of symbols and the second plurality of symbols of the second pattern are arranged as a plurality of corresponding pairs of symbols.

13. The printing device of claim 12, wherein the processor is further configured to compare a proximity of each pair of symbols of the first pattern with each corresponding pair of symbols of the second pattern.

14. The printing device of claim 11, wherein the first orientation is a portrait orientation of the printable media and the second orientation is a landscape orientation of the printable media.

15. The printing device of claim 11, wherein the first plurality of symbols of the first pattern comprise a plurality of pairs of numerical values and the second plurality of symbols of the second pattern comprise a plurality of corresponding pairs of numerical values, and wherein the image offset comprises a first offset value in the first orientation of the printable media and a second offset value in the second orientation of the printable media, and wherein, to determine the image offset of the printing device, the processor is further configured to:
select a first pair of numerical values of the first pattern and a corresponding first pair of symbols of the second pattern that are closest in proximity to each other;
set the first offset value using a first numerical value of the first pair of numerical values of the first pattern; and
determine the second offset value using a second numerical value of the first pair of numerical values of the first pattern.

16. The printing device of claim 11, wherein the second orientation is rotated 180° with respect to the first orientation.

* * * * *